US011857049B2

(12) United States Patent
Karan

(10) Patent No.: US 11,857,049 B2
(45) Date of Patent: Jan. 2, 2024

(54) TAMPER EVIDENT IDENTIFICATION TAG AND METHOD

(71) Applicant: Kenco Label & Tag Co., LLC, Milwaukee, WI (US)

(72) Inventor: Aharon A. Karan, Milwaukee, WI (US)

(73) Assignee: Kenco Label & Tag Co., LLC, Milwaukee, WI (US)

( * ) Notice: Subject to any disclaimer, the term of this patent is extended or adjusted under 35 U.S.C. 154(b) by 359 days.

(21) Appl. No.: 16/698,001

(22) Filed: Nov. 27, 2019

(65) Prior Publication Data

US 2021/0153618 A1 May 27, 2021

(51) Int. Cl.

*G09F 3/00* (2006.01)
*A45C 13/42* (2006.01)
*G09F 3/03* (2006.01)
*G09F 3/02* (2006.01)

(52) U.S. Cl.

CPC ............ *A45C 13/42* (2013.01); *G09F 3/0382* (2013.01); *G09F 2003/023* (2013.01); *G09F 2003/0254* (2013.01); *G09F 2003/0257* (2013.01); *G09F 2003/0272* (2013.01); *G09F 2003/0277* (2013.01)

(58) Field of Classification Search

CPC . A45C 13/42; G09F 3/0382; G09F 2003/023; G09F 2003/0254; G09F 2003/0257; G09F 2003/0272; G09F 2003/0277; G09F 3/0297; G09F 3/0341; G09F 3/0292; G09F 3/14; G09F 3/005; Y10T 24/33

USPC ............................................................... 40/6

See application file for complete search history.

(56) References Cited

U.S. PATENT DOCUMENTS

| | | | | |
|---|---|---|---|---|
| 4,631,845 | A * | 12/1986 | Samuel | G09F 3/0288 40/6 |
| 5,373,656 | A | 12/1994 | Merser | |
| 5,560,657 | A * | 10/1996 | Morgan | G09F 3/0292 283/80 |
| 5,799,425 | A | 9/1998 | Merser et al. | |
| 5,826,775 | A | 10/1998 | Mooney et al. | |
| 6,694,653 | B2 | 2/2004 | Bradfield et al. | |
| 7,810,267 | B2 * | 10/2010 | Saint | G09F 3/005 40/633 |
| 8,074,389 | B2 * | 12/2011 | Greer | G09F 3/005 40/633 |

(Continued)

FOREIGN PATENT DOCUMENTS

| | | | | |
|---|---|---|---|---|
| GB | 2448293 | A * | 10/2008 | G09F 3/00 |

*Primary Examiner* — Cassandra Davis

(74) *Attorney, Agent, or Firm* — Boyle Fredrickson, S.C.

(57) ABSTRACT

A tamper evident identification tag and a method are provided. The tag includes inner and outer layers. A tab is integral with and extends from at least one of the inner layer and the outer layer and through an article. A unique code associated with an article is printed on a first portion of the inner layer. The outer layer is configured to be foldable such that with a second portion of the inner layer removed from a second portion of the outer layer, the inner surface of the second portion of the outer layer is configured to be bound to the outer surface of the first portion of the inner layer so as to capture the first portion of the inner layer and a portion of the tab with the terminal end extending through an aperture between the first and second portions of the outer layer.

18 Claims, 4 Drawing Sheets

(56) References Cited

U.S. PATENT DOCUMENTS

| | | | | |
|---|---|---|---|---|
| 8,156,673 | B2 * | 4/2012 | Williams, Jr. | G09F 3/10 40/637 |
| 8,381,991 | B2 | 2/2013 | Atherton | |
| 10,255,830 | B2 | 4/2019 | Karan | |
| 10,565,901 | B2 | 2/2020 | Karan | |
| 2001/0022280 | A1 | 9/2001 | Kannabiran et al. | |
| 2005/0040226 | A1 * | 2/2005 | Al-Sheikh | G09F 3/005 235/380 |
| 2005/0178037 | A1 | 8/2005 | Kunreuther | |
| 2008/0048030 | A1 | 2/2008 | Garner | |
| 2009/0121010 | A1 | 5/2009 | Ireland et al. | |
| 2011/0031148 | A1 | 2/2011 | Rosendall et al. | |
| 2013/0219759 | A1 * | 8/2013 | Kimes | B31D 1/027 40/6 |
| 2017/0124919 | A1 * | 5/2017 | Karan | G06K 19/06028 |

* cited by examiner

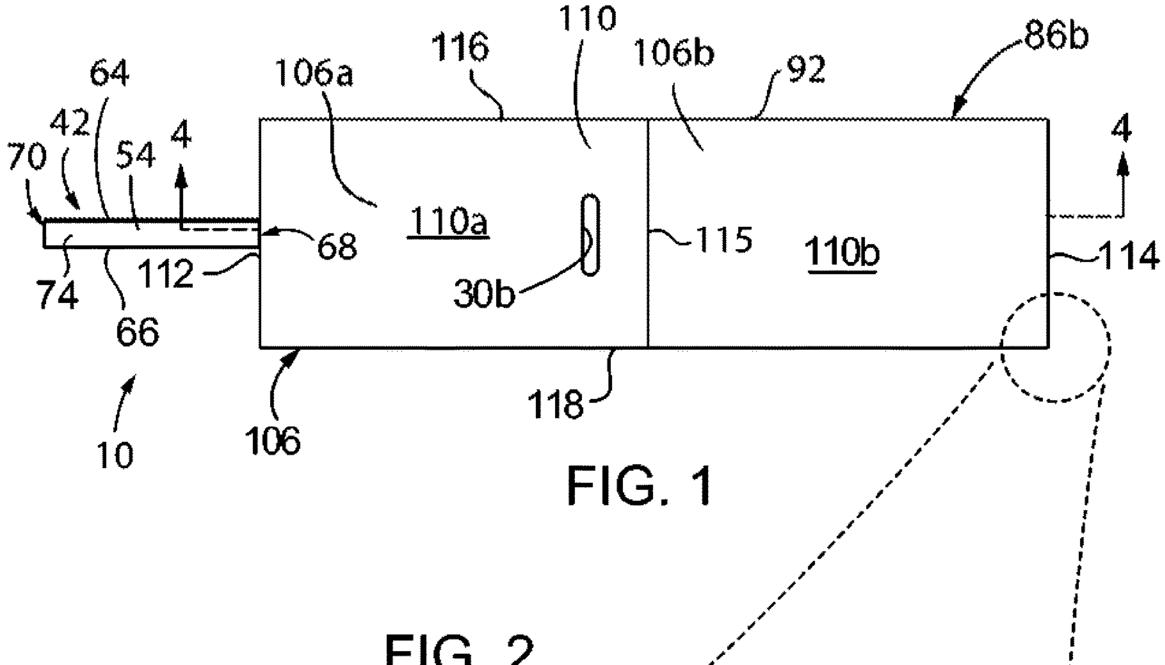
FIG. 1
FIG. 2
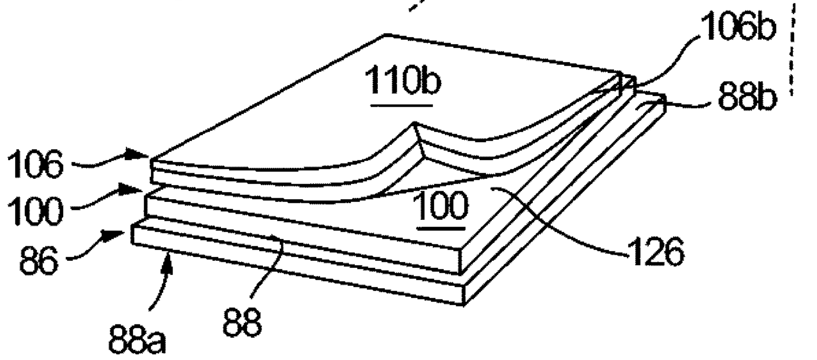
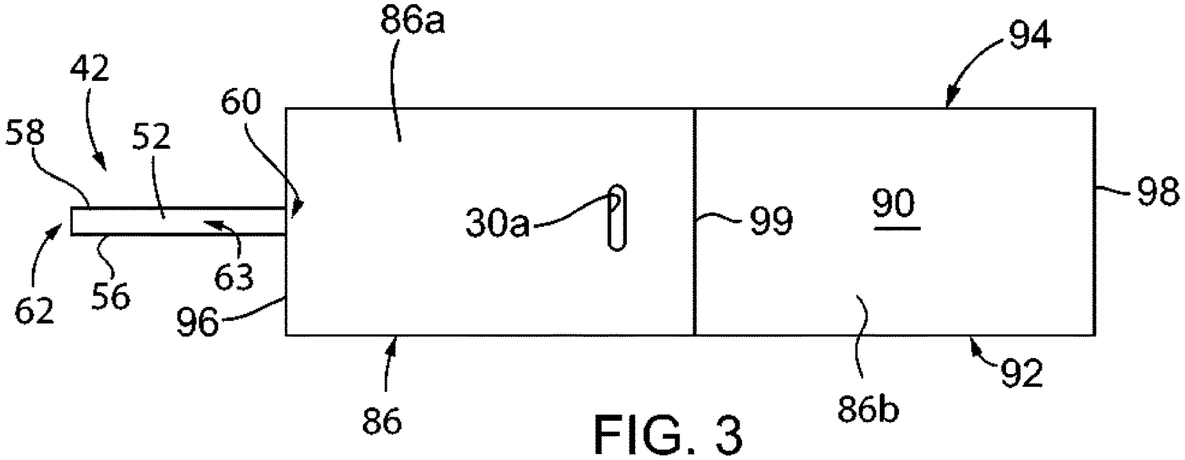
FIG. 3

TAMPER EVIDENT IDENTIFICATION TAG AND METHOD

FIELD OF THE INVENTION

This invention relates generally to security and the prevention of theft, and in particular, to an identification tag and method which allows for the association of a piece of luggage with an individual and which prevents tampering with the piece of luggage.

BACKGROUND AND SUMMARY OF THE INVENTION

In order to prevent theft, ideally, travelers should maintain their luggage in sight at all times after packing. However, it is not always possible for an individual to continually monitor their luggage. For example, hotel guests often have to figure out what to do with their luggage when the check in time for a flight is long after their hotel's check out time. Consequently, most hotels offer luggage storage services for their guests. But, such storage services only offer minimal security. Should a hotel guest leave his or her luggage unlocked, the hotel guest takes a chance that the items within their luggage will be stolen or tampered with. Alternatively, if a hotel guest/traveler locks his or her luggage, the hotel guest/traveler runs the risk of having their luggage damaged or the locks on their luggage cut by the Transportation Security Administration (TSA) during inspection at the airport.

TSA recommends that all passengers should leave their luggage unlocked so that any piece of luggage that appears suspicious can easily be examined without damaging the latches or cutting locks. However, since TSA has suggested that all luggage remain unlocked, there have been thousand of complaints of luggage tampering by travelers. It can be appreciated that unlocked luggage may be a significant temptation for petty thieves.

As is known, TSA utilizes its "PreCheck" program as a way to clear passengers who have been vetted and confirmed in advance, allowing for swifter passage through security checkpoints and shortening the lines for other passengers. In addition, these "cleared" passengers may include a laptop in its case and a 3-1-1 compliant bag (which can contain items with small quantities of liquids and gels, such as a travel-size bottles hair spray, contact solution or shampoo) in their carry-on luggage. However, the carry-on luggage of these "cleared" passengers must still be inspected, thereby reducing the speed through which these "cleared" passengers pass through security checkpoints. As such, it is highly desirable to provide an identification tag which allows a user to seal their luggage to prevent tampering therewith so as to potentially allow the carry-on luggage of passengers cleared through TSA's "PreCheck" program to pass through security checkpoints with minimal or no inspection.

Therefore, it is a primary object and feature of the present invention to provide an identification tag and method which allows for the association of a piece of luggage with an individual and which prevents tampering with the piece of luggage.

It is a further object and feature of the present invention to provide an identification tag and method which allows for the association of a piece of luggage with an individual that facilitates the swifter passage of the individual through security checkpoints at transportation hubs, such as airports and train stations.

It is a further object and feature of the present invention to provide an identification tag and method which allows for the association of a piece of luggage with an individual and which prevents tampering with the piece of luggage which is simple to use and inexpensive to manufacture.

In accordance with the present invention, an identification tag is provided. The identification tag includes an outer layer having first and second portions, an inner surface and an outer surface. An adhesive is disposed on the first and second portions of the inner surface of the outer layer. An inner layer has first and second portions, an inner surface, and an outer surface. The inner surface of the first portion of the inner layer is bound to the inner surface of the first portion of the outer layer by the adhesive and the inner surface of the second portion of the inner layer is removeably affixed to the inner surface of the second portion of the outer layer. A tab is integral with and extends from at least one of the inner layer and the outer layer. The tab has a terminal end receivable in an aperture extending through the inner and outer layers. A unique code associated with an article is printed on the first portion of the inner layer. The outer layer is configured to be foldable such that with the second portion of the inner layer removed from the second portion of the outer layer, the inner surface of the second portion of the outer layer is configured to be bound to outer surface of the first portion of the inner layer so as to capture the first portion of the inner layer and a portion of the tab with the terminal end extending through the aperture between the first and second portions of the outer layer. The unique code on the first portion of the inner layer is viewable through the outer layer with the first portion of the inner layer captured between the first and second portions of the outer layer.

A non-binding layer of material may be affixed to the inner surface of the second portion of the inner layer. The material may be one of silicone and wax. The unique code includes at least one of a barcode and an alphanumeric code and the outer layer is transparent. The unique code associated with the article may also be printed on the second portion of the inner layer and an image of an individual associated with the article may be printed on the second portion of the inner layer.

In accordance with a further aspect of the present invention, a method of associating an identification tag with an article is provided. The method includes the step of providing the identification tag with first and second layers laminated to each other and a tab extending therefrom. The second layer includes first and second portions. The tab is inserted through the article at a user selected location thereof and a portion of the tab is positioned adjacent the first portion of the second layer of the identification tag. The second portion of the second layer is removed to expose an adhesive on a second portion of the first layer. The second portion of the first layer of the identification tag is folded over a first portion of the first layer so as to capture the first portion of the second layer between the first and second portions of the first layer and to capture the portion of the tab between the second portion of the first layer and the first portion of the second layer of the identification tag thereby retaining the article on the tab.

The second layer is adapted for receiving printing thereon and security information may be printed on a first side of the second layer of the identification tag. The first portion of the first layer includes an adhesive thereon and the first portion of the second layer being bound to the first portion of the first layer by the adhesive. The second portion of the second layer has a non-binding layer of material affixed thereto. The material is one of silicone and wax. The second layer has a printable surface and at least one of a barcode and an alphanumeric code may be printed on the second layer.

The tab has a terminal end and the step of positioning the portion of the tab adjacent the first portion of the second layer of the identification tag includes the additional step of inserting the terminal end of the tab through an aperture extending through the first and second layers. The tab has a first end integral with the first portion of the second layer. The first end of the tab and the portion of the tab captured between the second portion of the first layer and the first portion of the second layer of the identification tag define a loop therebetween having a length. The article is retained on the loop. The portion of the tab captured on the first portion of the second layer of the identification tag is a first portion of the tab and the tab includes a second portion between the first portion of the tab and the terminal end. The second portion of the tab has a length. The length of the loop is varied in response to varying the length of the second portion of the tab prior to capturing the first portion of the tab between the second portion of the first layer and the first portion of the second layer of the identification tag.

A unique code associated with an article may be provided on the second portion of the second layer and on the first portion of the second layer. The unique code on the second portion of the second layer may be compared with the unique code on the first portion of the second layer. An image of an individual associated with the article may be provided on the first portion of the second layer and compared to the individual to confirm an association of the article and the individual.

In accordance with a still further aspect of the present invention, a method of associating an individual with an article utilizing an identification tag is provided. The method includes the steps of providing the identification tag with first and second layers laminated to each other and a tab extending therefrom. The second layer includes first and second portions and the tab having a first end interconnected to at least one of the first and second layers, a second end, a first portion adjacent the first adjacent the first end, a second portion adjacent the first portion and a third portion between the second portion and the second end. A unique code associated with an article is provided on the first portion of the second layer and on the second portion of the second layer. The tab is inserted through the article at a user selected location thereof and the second end of the tab is inserted though an aperture extending through the first and second layers. The second portion of the tab is positioned adjacent the first portion of the second layer of the identification tag and the second portion of the second layer is removed to expose an adhesive on a second portion of the first layer. The second portion of the first layer of the identification tag is folded over a first portion of the first layer so as to capture the first portion of the second layer between the first and second portions of the first layer and to capture the second portion of the tab between the second portion of the first layer and the first portion of the second layer of the identification tag such that the first portion of the tab defines a loop receiving the article thereon. The loop has a length and the length of the loop is varied in response to varying the length of the third portion of the tab prior to capturing the first portion of the tab between the first portion of the first layer and the second portion of the second layer of the identification tag.

The unique code on the first portion of the second layer are compared on the second first portion of the second layer. An image of an individual associated with the article is printed on the first portion of the second layer. The image of the individual on the first portion of the second layer is compared with the individual to confirm an association of the article and the individual.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 1 is top plan view of a tamper evident identification tag in accordance with the present invention in an initial configuration;

FIG. 2 is an enlarged isometric view showing the layers of the tamper evident identification tag of FIG. 1;

FIG. 3 is a bottom plan view of the tamper evident identification tag of the present invention in the initial configuration;

DETAILED DESCRIPTION OF THE DRAWINGS

Figure 4:
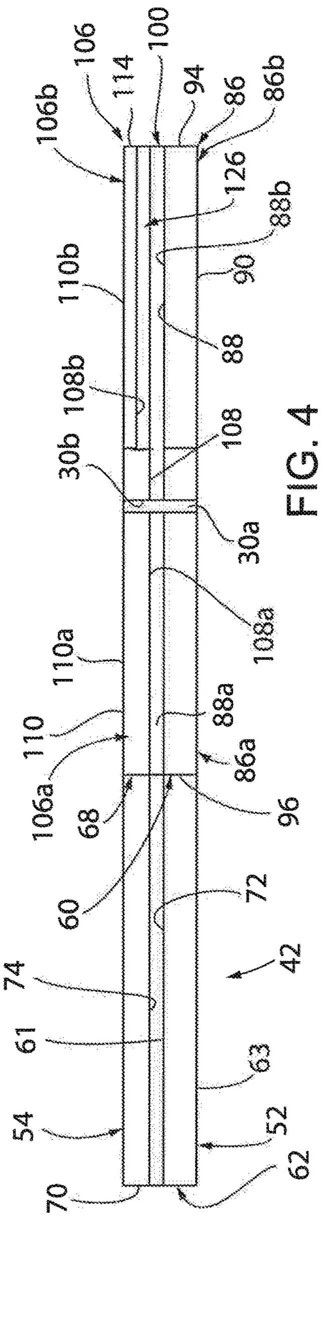
FIG. 4 is a cross-sectional view of the tamper evident identification tag of the present invention taken along line 4-4 of FIG. 1.

Referring to FIG. 1, a tamper evident identification tag which allows for the association of a piece of luggage with an individual and which prevents tampering with the piece of luggage is generally designated by the reference numeral 10. As hereinafter described, it is intended to interconnect tag 10 to a piece of furniture 12, FIG. 9. Referring to FIGS. 1-8 is formed from tag material constructed of a plurality of layers. As best seen in FIG. 3, tag 10 includes a first outer transparent layer 86 formed from a generally clear or transparent material. Transparent layer 86 is defined by first and second spaced edges 92 and 94, respectively, and first and second spaced ends 96 and 98, respectively. A fold line 99 is transverse to first and second edges 92 and 94, respectively, at location generally equidistant from first and second ends 96 and 98, respectively. Fold line 99 is generally parallel to first and second ends 96 and 98, respectively, and divides transparent layer 86 into first and second portions **86*a* and 86*b*, respectively. In the depicted embodiment, transparent layer 86** has a generally rectangular configuration. However, other configurations are possible without deviating from the scope of the present invention.

With reference to FIGS. 2-4, transparent layer 86 further includes an inner surface 88 and an outer surface 90. It is contemplated for first portion **88*a* of inner surface 88 associated with first portion 86*a* of transparent layer 86 to have a surface area approximately equal to the surface area of second portion 88***b* of inner surface 88 associated with second portion 86*b* of transparent layer 86. An aperture 30*a* extends through first portion 86*a* of transparent layer 86, for reasons hereinafter described. It is contemplated for outer surface 90 of transparent layer 86 to be printable surface so as to allow desired information to be printed thereon. Adhesive 100 is provided on and is affixed to the entirety of inner surface 88 of the transparent layer 86.

Referring to FIGS. 1-2 and 4, second, inner backing layer 106 is positioned over transparent layer 86. Backing layer 106 includes first and second spaced edges 116 and 118, respectively, and first and second spaced ends 112 and 114, respectively. A scored or perforated line 115 is transverse to and first and second edges 116 and 118, respectively, at a location generally equidistant from first and second ends 112 and 114, respectively. Perforated line 115 is generally parallel to first and second ends 112 and 114, respectively, and divides backing layer 106 into first and second portions 106*a* and 106*b*, respectively.

Backing layer 106 further includes an inner surface 108 and an outer surface 110. It is contemplated for a first portion 108*a* of inner surface 108 of backing layer 106 associated with first portion 106*a* of backing layer 106 to have a surface area approximately equal to the surface area of first portion 88*a* of inner surface 88 of transparent layer 86 and for a second portion 108*b* of inner surface 108 of backing layer 106 associated with second portion 106*b* of backing layer 106 to have a surface area generally equal to the surface area of second portion 88*b* of inner surface 88 of transparent layer 86. A non-binding material such as silicone 126 is bonded to second portion 108*b* of inner surface 108 of backing layer 106, for reasons hereinafter described. In addition, an aperture 30*b* extends through first portion 106*a* of backing layer 106, for reasons hereinafter described. As described, backing layer 106 has a generally rectangular configuration. However, other configurations are possible without deviating from the scope of the present invention.

Figure 5:
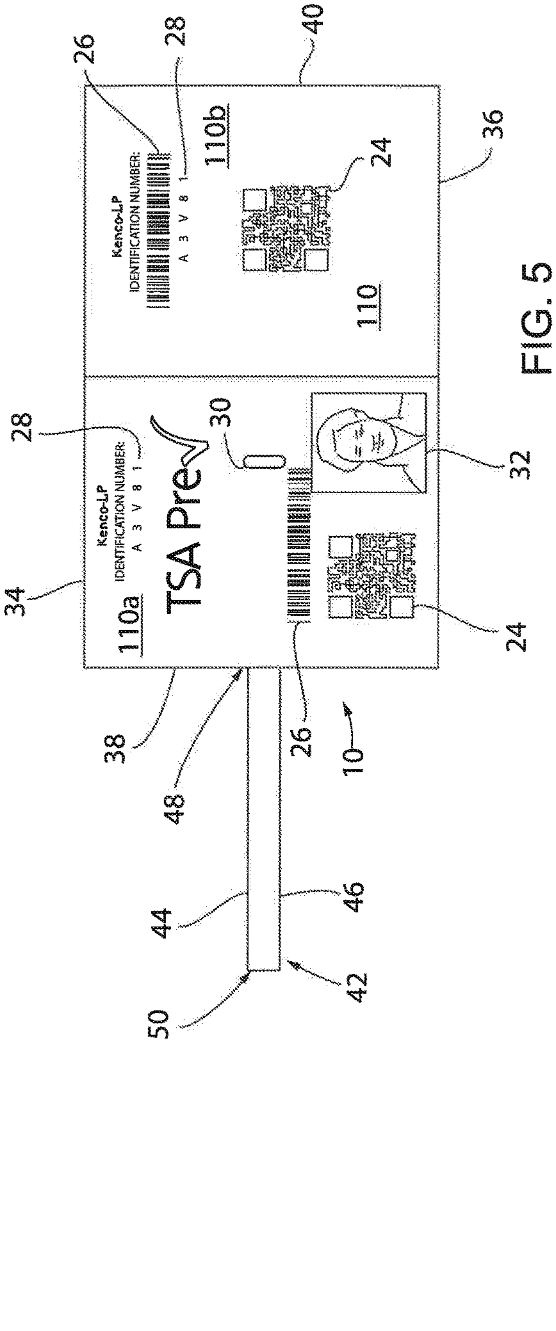
FIG. 5 is a top plan view of the tamper evident identification tag of FIG. 1 having various information printed.

It is contemplated for outer surface 110 of backing layer 106 to be a printable surface so as to allow desired information to be printed thereon, FIG. 5. Outer surface 110 of backing layer 106 has first and second portions 110*a* and 110*b*, respectively. It is contemplated to print any information on first portion 110*a* of outer surface 110 of backing layer 106, as required to associate piece of luggage 12 with an individual. By way of example, a barcode generally designated by the reference number 26 may be printed on first portion 110*a* of outer surface 110 of backing layer 106, as well as, other types of unique identifiers such as a matrix code or a quick response code 24, a unique alphanumeric code 28, and an image 32 of an individual associated with piece of luggage 12. Likewise, barcode 26, quick response code 24, and a unique alphanumeric code 28 may be printed on second portion 110*b* of outer surface 110 of backing layer 106.

First portion 108*a* of inner surface 108 of backing layer 106 is aligned with and positioned against the adhesive 100 bonded to first portion 88*a* of inner surface 88 of transparent layer 86 so as to bond first portion 106*a* of backing layer 106 to first portion 86*a* of transparent layer 86. It is intended for the adhesive 100 to have sufficient adhesive characteristics such that once first portion 106*a* of backing layer 106 is bonded to first portion 86*a* of transparent layer 86, first portion 106*a* of backing layer 106 and first portion 86*a* of transparent layer 86 cannot be separated without damaging tag 10. Similarly, second portion 108*b* of inner surface 108 of backing layer 106, having silicone 126 bonded thereto, is aligned with and positioned against the adhesive 100 bonded to second portion 88*b* of inner surface 88 of transparent layer 86 thereby releasably affixing second portion 106*b* of backing layer 106 to second portion 86*b* of transparent layer 86. Silicone 126 or other non-binding material, e.g., wax or Teflon, prevents second portion 106*b* of backing layer 106 from becoming permanently bonded to the adhesive layer 100. As such, it can be appreciated that silicone 126 on second portion 108*b* of inner surface 108 of backing layer 106 allows for second portion 106*b* of backing layer 106 to be removed from second portion 86*b* of transparent layer 86, for reasons hereinafter described.

As best seen in FIG. 5, with backing layer 106 bonded to transparent layer 86 to each other as heretofore described, first edge 116 of backing layer 106 and first edge 92 of transparent layer 86 define first edge 34 of tag 10; second edge 118 of backing layer 106 and second edge 94 of transparent layer 86 define second edge 36 of tag 10; first end 112 of backing layer 106 and first end 96 of transparent layer 86 define first end 38 of tag 10; and second end 114 of backing layer 106 and second end 98 of transparent layer 86 define second end 40 of tag 10. In addition, perforated line 115 of backing layer 106 is aligned with fold line 99 of transparent layer 86 and aperture 30*b* through first portion 106*a* of backing layer 106 is axially aligned with aperture 30*a* through first portion 86*a* of transparent layer 86 so as to define aperture 30 through tag 10.

Tab 42 projects from first end 38 of tag 10. Tab 42 is defined by first and second spaced edges 44 and 46, respectively, and first and second ends 48 and 50, respectively. It is contemplated for first end 48 of tab 42 to be integrally formed with first end 38 of tag 10. For example, tab 42 may be integral with transparent layer 86, backing layer 106 or both. Referring to FIGS. 1, 3-4 and 6, in the depicted embodiment, tab 42 is defined by first, outer layer 52 and second, inner layer 54 bonded together by adhesive 100. Outer layer 52 is defined by first and second spaced edges 56 and 58, respectively, first end 60 integrally formed with first end 96 of transparent layer 86, and a terminal second end 62. Outer layer 52 further includes an inner surface 61 and an outer surface 63. Adhesive 100 is provided on and is affixed to the entirety of inner surface 61 of outer layer 52.

Inner layer 54 is defined by first and second spaced edges 64 and 66, respectively, first end 68 integrally formed with first end 112 of backing layer 106, and a terminal second end 70, FIG. 1. Inner layer 54 further includes an inner surface 72 and an outer surface 74. Inner surface 72 of inner layer 54 is aligned with and positioned against the adhesive 100 bonded to inner surface 61 of outer layer 52 so as to bond inner and outer layers 54 and 52, respectively, of tab 42. It is intended for the adhesive 100 to have sufficient adhesive characteristics such that once inner and outer layers 54 and 52, respectively, of tab 42 are bonded together, inner and outer layers 54 and 52, respectively, of tab 42 cannot be separated without damaging tab 42.

With outer layer 52 bonded to inner layer 54 to each other as heretofore described, first edge 56 of outer layer 52 and first edge 64 of inner layer 54 define first edge 44 of tab 42; second edge 58 of outer layer 52 and second edge 66 of inner layer 54 define second edge 46 of tab 42; first end 60 of outer layer 52 and first end 68 of inner layer 54 define first end 48 of tab 42; and second end 62 of outer layer 52 and second end 70 of inner layer 54 define second end 50 of tab 42.

As is known, a piece of luggage includes an opening to provide access to the interior thereof. These openings can take on various configurations. For example, some pieces of luggage have a clamshell design wherein two "shells" are foldable between an open and closed configuration. Alternatively, some pieces of luggage utilize a flap which is movable between open and closed configurations. In most cases, these various types of luggage utilize a two way, head to head zipper to facilitate the opening and closing thereof. Two way, head to head zippers have sliders that are in contact with each other when the zipper is closed. To open the piece of luggage and gain access to the interior thereof, the two sliders are pulled away from each other and towards the stops located at both ends of the zipper tape. Hence, by preventing the two sliders of the zipper to be pulled away from each other, one can prevent access to the interior of a piece of luggage.

By way of example, in operation, it is intended to interconnect tag 10 to piece of luggage 12 to prevent the two sliders 73 and 74 of two way, head to head zipper 76 of a closed piece of luggage 12 from being pulled away from each other in order to prevent access to the interior of piece of luggage 12 and keep the contents within the interior of piece of luggage 12 safe from theft and tampering. More specifically, with sliders 73 and 74 of zipper 76 in contact with each other, second end 50 of tab 42 of tag 10 is inserted through opening 81*a* through pull 81 of slider 73 and through opening 83*a* through pull 83 of slider 74. Thereafter, tab 42 is folded back onto itself such that a first portion 75 of tab 42 defines loop 77 capturing sliders 73 and 74 thereon, FIGS. 7-9; second portion 79 of tab 42 is positioned adjacent to second portion 110*a* of outer surface 110 of backing layer 106; and second end 50 of tab 42 of tag 10 is inserted through aperture 30 in tag 10 such that a third portion 85 of tab 42 projects from transparent layer 86, FIG. 8. It can be appreciated that by adjusting the length of third portion 85 of tab 42 projecting from transparent layer 86 of tag 10, the length of loop 77 may be correspondingly adjusted, thereby allowing a user to maintain sliders 73 and 74 adjacent one another or limit the distance sliders 73 and 74 may be pulled away from each other.

Figure 6:
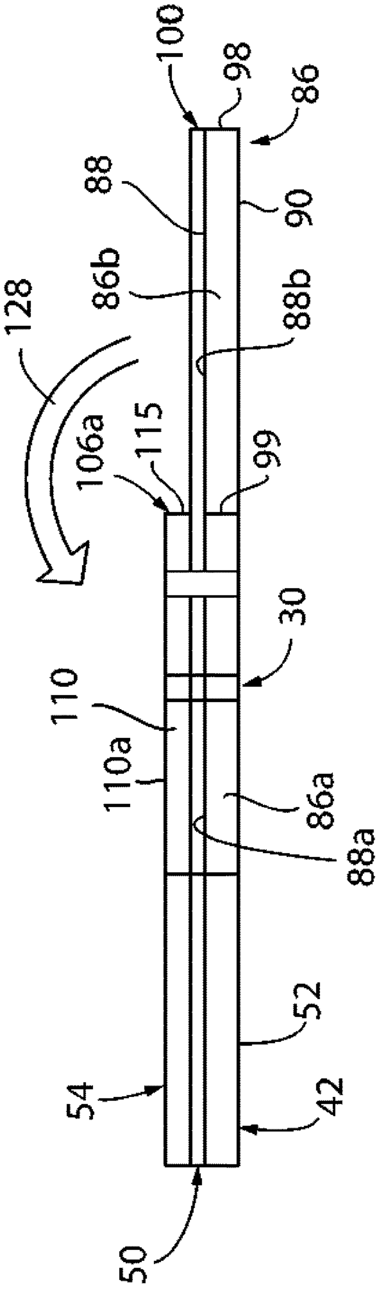
FIG. 6 is a cross-sectional view of the tamper evident identification tag of the present invention, similar to FIG. 4, having a first portion of a backing layer removed.
Figure 7:
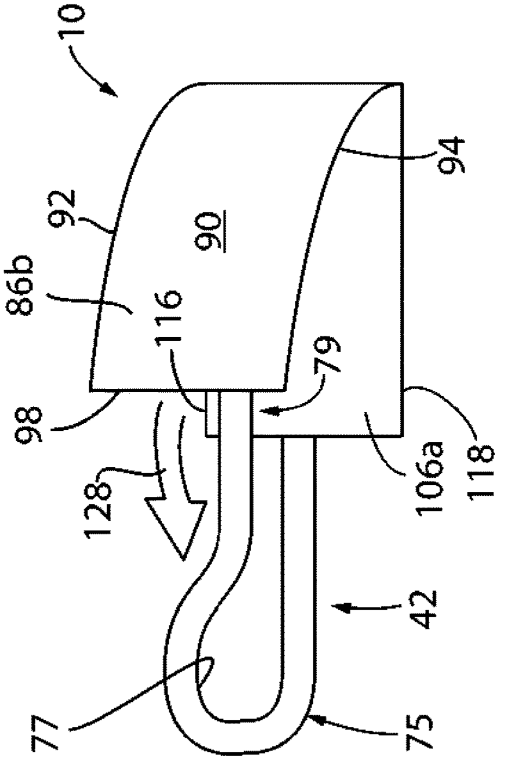
FIG. 7 is an isometric view of the tamper evident identification tag of FIG. 6 being folded into a second configuration.

Once tab 42 is positioned in a user selected position, as heretofore described, second portion 106*b* of backing layer 106 is removed from tag 10 so as to expose the adhesive 100 bonded to second portion 88*b* of inner surface 88 of transparent layer 86, FIG. 6. Once second portion 106*b* of backing layer 106 is separated from tag 10, second portion 86*b* of transparent layer 86 is folded along fold line 99 over first portion 110*a* of outer surface 110 of first portion 106*a* of backing layer 106, in the direction shown by arrow 128, FIG. 7. Once second edge 94 of transparent layer 86 is aligned with first edge 92 of transparent layer 86, the adhesive 100 bonded to second portion 88*b* of inner surface 88 of transparent layer 86 is brought into contact with first portion 110*a* of outer surface 110 of first portion 106*a* of backing layer 106 such that second portion 86*b* of transparent layer 86 becomes bonded to first portion 106*a* of backing layer 106 by adhesive 100, FIG. 8. It is intended for the adhesive 100 to have sufficient adhesive characteristics such that once second portion 86*b* of transparent layer 86 is bonded to first portion 106*a* of backing layer 106, first portion 106*a* of backing layer 106 and first portion 86*a* of transparent layer 86 cannot be separated without damaging tag 10.

Figure 8:
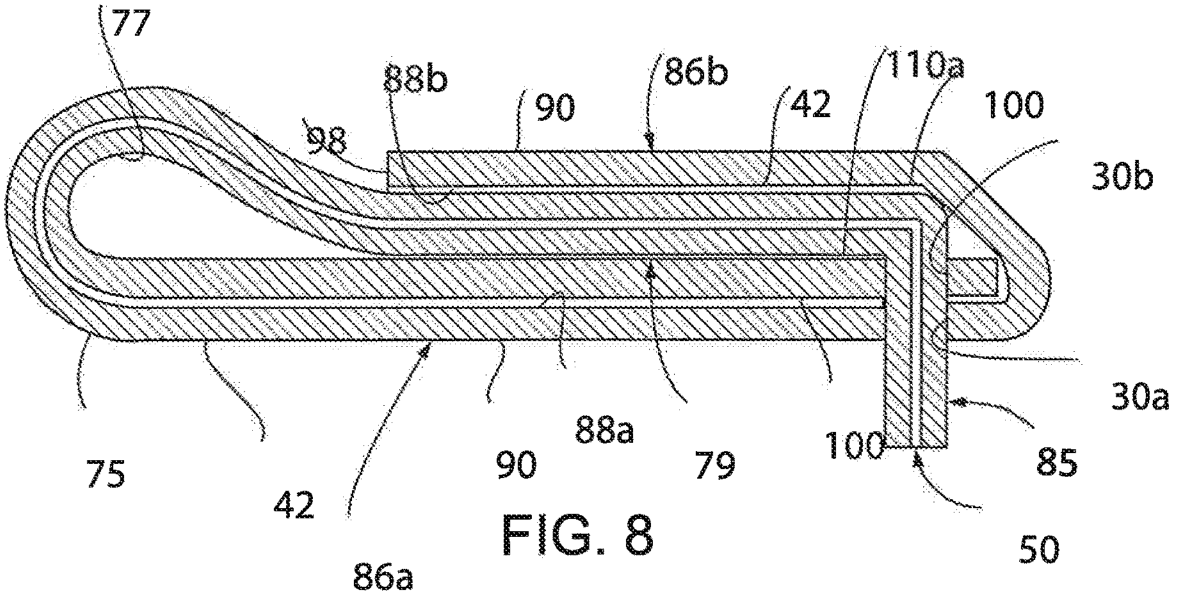
FIG. 8 is a cross-sectional view of the tamper evident identification tag of the present invention in the second configuration.
Figure 9:
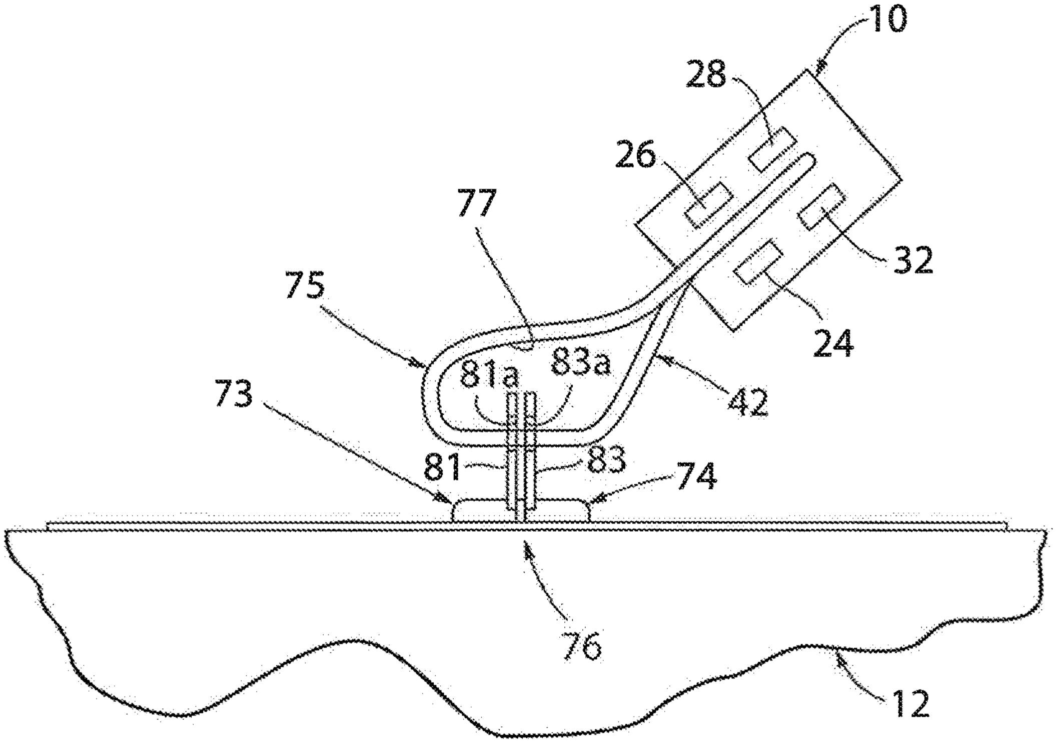
FIG. 9 is a top plan view of the tamper evident identification tag in accordance with the present invention interconnected to a piece of luggage.

With second portion 86*b* of transparent layer 86 bonded to first portion 106*a* of backing layer 106, second portion 79 of tab 42 positioned on first portion 110*a* of outer surface 110 of backing layer 106 is captured therebetween, FIGS. 8-9. As a result, tag 10 cannot be removed from piece of luggage 12 without damaging either tag 10, tab 42 or piece of luggage 12. By interconnecting sliders 73 and 74 of zipper 76 with tab 42 of tag 10, a user, such as a hotel guest or an airline passenger, may prevent access to the interior of piece of luggage 12 and keeping the contents within the interior of piece of luggage 12 safe from theft and tampering. It can be understood that the transparent nature of layer 86 allows for a user confirm tag 10 is correctly attached to piece of luggage 12 and to visually determine if tampering with tag 10 has occurred.

In the event that an individual, such as a hotel guest, wishes to leave piece of luggage 12 with a third party storage service, such as the storage services provided by most hotels, the third party storage service may provide tag 10 to the individual. As described above, tag 10 may include barcode 26, quick response code 24, and unique alphanumeric code 28 printed on first portion 110*a* of outer surface 110 of backing layer 106. In addition, barcode 26, quick response code 24, and unique alphanumeric code 28 may be printed on second portion 110*b* of outer surface 110 of backing layer 106. After securing the interior of piece of luggage 12 with tag 10 supplied by the third party storage service, the individual may use second portion 106*b* of backing layer 106 removed from tag 10, as heretofore described, as a claim check to allow a user to claim the stored piece of luggage. More specifically, when the individual claims piece of luggage 12, the attendant at the third party storage service can simply compare (either manually or electronically) the barcode 26, quick response code 24, and/or unique alphanumeric code 28 on tag 10 interconnected to piece of luggage 12 with barcode 26, quick response code 24, and/or unique alphanumeric code 28 printed on second portion 110*b* of outer surface 110 of second portion 106*b* of backing layer 106 (or in other words, the claim check) provided by an individual to confirm piece of luggage 12 belongs to the individual. The process insures that no one from the third party storage service can steal from or tamper with the contents of piece of luggage without damaging piece of luggage 12 or tag 10.

In the event an individual is a member of TSA's "PreCheck" program and would like for piece of luggage 12 to pass through TSA security checkpoints with minimal or no inspection, the individual may seal the contents of piece of luggage 12, as heretofore described, with personally identifiable tag 10. Personally identifiable tag 10 may include a unique barcode 26, a quick response code 24, and/or a unique alphanumeric code 28 associated with the individual's TSA's "PreCheck" account printed on first portion 110*a* of outer surface 110 of backing layer 106. In addition, image 32 of the individual may be printed on first portion 110*a* of outer surface 110 of backing layer 106.

When passing through a security checkpoint, a TSA agent may simply electronically scan unique barcode 26, quick response code 24, and/or unique alphanumeric code 28 and compare previously stored information in TSA records for the TSA "PreCheck" member to confirm the individual has been cleared through TSA's "PreCheck" program to pass through the security checkpoint with minimal or no inspection. For further protection, the TSA agent can also compare the image of the individual on tag 10 with the individual requesting piece of luggage 12 to confirm the individual attempting to utilize personally identifiable tag 10 is, in fact, the individual cleared through TSA's "PreCheck" program.

It can be appreciated that the above description of a tamper evident tag is merely exemplary of the present invention. Various modes of carrying out the invention are contemplated as being within the scope of the following claims particularly pointing out and distinctly claiming the subject matter, which is regarded as the invention.

I claim:

1. An identification tag, comprising:

an outer layer having first and second portions, an inner surface and an outer surface;

an adhesive disposed on the first and second portions of the inner surface of the outer layer;

an inner layer having first and second portions, an inner surface, and an outer surface, the inner surface of the first portion of the inner layer being bound to the inner surface of the first portion of the outer layer by the adhesive and the inner surface of the second portion of the inner layer being removably affixed to the inner surface of the second portion of the outer layer;

a tab having:

a first layer extending from the inner layer and being integral with the inner layer so as to prevent separation of the first layer from the inner layer;

a second layer extending from the outer layer and being:

non-releasably bonded to the first layer;

integral with the outer layer so as to prevent separation of the second layer from the outer layer; and a terminal end;

an aperture extending through the inner and outer layers, the aperture configured to allow the terminal end of the tab to pass therethrough such that at least a portion of the tab defines a loop having a length;

a unique code associated with an article printed on the first portion of the inner layer; wherein:

the outer layer is configured to be foldable such that with the second portion of the inner layer removed from the second portion of the outer layer, the inner surface of the second portion of the outer layer is configured to be bound to outer surface of the first portion of the inner layer so as to capture the first portion of the inner layer and a portion of the tab with the terminal end extending through the aperture between the first and second portions of the outer layer, thereby defining an item tag; and the unique code on the first portion of the inner layer is viewable through the outer layer with the first portion of the inner layer captured between the first and second portions of the outer layer;

wherein:

the second portion of the inner layer:

is detachable from the first portion of the inner layer;

includes the unique code associated with the article printed thereon; and defines a claim check so as to allow a third party to associate a bearer of the claim check with the item tag; and the length of the loop may be varied in response to varying a length of the tab passing through the aperture.

2. The identification tag of claim 1 further comprising a non-binding layer of material affixed to the inner surface of the second portion of the inner layer.

3. The identification tag of claim 2 wherein the material is one of silicone and wax.

4. The identification tag of claim 1 wherein the unique code includes at least one of a barcode and an alphanumeric code.

5. The identification tag of claim 1 wherein the outer layer is transparent.

6. The identification tag of claim 1 further comprising an image of an individual associated with the article is printed on the second portion of the inner layer.

7. A method of associating an identification tag with an article, the method comprising the steps of:

providing the identification tag with first and second layers laminated to each other and a tab extending therefrom, the first layer including first and second portions, the second layer including first and second portions and the tab having:

an outer layer extending from the first portion of the first layer and being integral with the first portion of the first layer so as to prevent separation of the outer layer from the first layer;

an inner layer non-releasably bonded to the outer layer and extending from the first portion of the second layer, the inner layer being integral with the first portion of the second layer so as to prevent separation of the inner layer from the second layer; and a first end and a second terminal end;

printing a unique code associated with an article on the first portion of the second layer;

printing the unique code associated with an article on the second portion of the second layer;

inserting the tab having first, second and third portions through the article at a user selected location thereof;

positioning the second portion of the tab on the first portion of the second layer of the identification tag;

inserting the terminal end of the tab through an aperture extending through the first and second layers such that the third portion of the tab projects from the identification tag, the third portion having a variable length;

detaching the second portion of the second layer from the first portion of the second layer and removing the second portion of the second layer to expose an adhesive on a second portion of the first layer, the detached second portion of the second layer defining a claim check;

folding the second portion of the first layer of the identification tag over a first portion of the first layer so as to capture the first portion of the second layer between the first and second portions of the first layer and to capture the second portion of the tab between the first portion of the second layer and the second portion of the first layer of the identification tag thereby retaining the article on the first portion of the tab;

comparing the unique code on the second portion of the second layer with the unique code on the first portion of the second layer; and determining if a bearer of the claim check is associated with the article in response to the comparison of the unique code on the second portion of the second layer with the unique code on the first portion of the second layer;

wherein:

the first portion of the tab defines a loop therebetween having a length with the second portion of the tab captured between the second portion of the first layer and the first portion of the second layer;

the article is retained on the loop; and the length of the loop is varied in response to varying the length of the third portion of the tab prior to capturing the second portion of the tab between the second portion of the first layer and the first portion of the second layer of the identification tag.

8. The method of claim 7 comprising the additional step of printing security information on a first side of the second layer of the identification tag.

9. The method of claim 7 wherein:

the second portion of the first layer includes an adhesive thereon; and the first portion of the second layer is bound to the first portion of the first layer by the adhesive.

10. The method of claim 9 wherein the second portion of the second layer has a non-binding layer of material affixed thereto.

11. The method of claim 10 wherein the material is one of silicone and wax.

12. The method of claim 7 wherein the unique code is at least one of a barcode and an alphanumeric code.

13. The method of claim 7 comprising the additional step of providing an image of an individual associated with the article on the first portion of the second layer.

14. The method of claim 13 comprising the additional step of comparing the image of the individual on the first portion of the second layer with the individual to confirm an association of the article and the individual.

15. A method of associating an individual with an article utilizing an identification tag, the method comprising the steps of:

providing the identification tag with first and second layers laminated to each other and a tab extending therefrom, the first layer including first and second portions, the second layer including first and second portions and the tab having:

an outer layer extending from the first portion of the first layer and being integral with the first portion of the first layer so as to prevent separation of the outer layer from the first layer;

an inner layer non-releasably bonded to the outer layer and extending from the first portion of the second layer, the inner layer being integral with the first portion of the second layer so as to prevent separation of the inner layer from the second laver;

a first end interconnected to the first and second layers;

a second end;

a first portion adjacent to the first end;

a second portion adjacent the first portion; and a third portion between the second portion and the second end;

providing a unique code associated with an article on the first portion of the second layer;

providing the unique code associated with an article on the second portion of the second layer;

inserting the tab through the article at a user selected location thereof;

inserting the second end of the tab through an aperture extending through the first and second layers such that the third portion of the tab projects from the identification tag;

positioning the second portion of the tab on the first portion of the second layer of the identification tag;

detaching the second portion of the second layer from the first portion of the second layer and removing the second portion of the second layer to expose an adhesive on a second portion of the first layer, the second portion of the second layer defining a claim check;

folding the second portion of the first layer of the identification tag over a first portion of the first layer so as to capture the first portion of the second layer between the first and second portions of the first layer and to capture the second portion of the tab between the second portion of the first layer and the first portion of the second layer of the identification tag such that the first portion of the tab defines a loop receiving the article thereon;

wherein:

the loop has a length and further comprising the additional step of varying the length of the loop in response to varying the length of the third portion of the tab prior to capturing the second portion of the tab between the second portion of the first layer and the first portion of the second layer of the identification tag; and a comparison of the unique code on the second portion of the second layer with the unique code on the first portion of the second layer allows a third party to determine if a bearer of the claim check is associated with the article.

16. The method of claim 15 comprising the additional step of comparing the unique code on the second portion of the second layer with the unique code on the first portion of the second layer.

17. The method of claim 15 comprising the additional step of providing an image of an individual associated with the article on the first portion of the second layer.

18. The method of claim 17 comprising the additional step of comparing the image of the individual on the first portion of the second layer with the individual to confirm an association of the article and the individual.

* * * * *